(12) United States Patent
Crouse et al.

(10) Patent No.: US 7,851,737 B2
(45) Date of Patent: Dec. 14, 2010

(54) SYSTEM AND METHOD FOR CHARGING A CONTROL DEVICE FROM A LIGHTING SYSTEM

(75) Inventors: Kent E. Crouse, Carpentersville, IL (US); Ling Wang, Millwood, NY (US); William L. Keith, Circle Lakehills, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 326 days.

(21) Appl. No.: 12/094,608

(22) PCT Filed: Nov. 27, 2006

(86) PCT No.: PCT/IB2006/054460

§ 371 (c)(1),
(2), (4) Date: May 22, 2008

(87) PCT Pub. No.: WO2007/063480

PCT Pub. Date: Jun. 7, 2007

(65) Prior Publication Data

US 2008/0265782 A1 Oct. 30, 2008

Related U.S. Application Data

(60) Provisional application No. 60/740,839, filed on Nov. 30, 2005.

(51) Int. Cl.
*G01J 1/32* (2006.01)

(52) U.S. Cl. .................................. 250/205; 250/214 R

(58) Field of Classification Search .................. 250/205, 250/214 R, 214.1, 214 LA; 315/152–158, 315/224, 312; 307/66; 136/246; 362/183; 340/636.2; 327/514, 482; 320/166
See application file for complete search history.

(56) References Cited

U.S. PATENT DOCUMENTS

| 6,340,864 | B1 | 1/2002 | Wacyk |
| 7,224,131 | B2* | 5/2007 | Wilhelm ..................... 315/312 |
| 2005/0030177 | A1 | 2/2005 | Albsmeier et al. |

FOREIGN PATENT DOCUMENTS

| EP | 0527347 A2 | 2/1993 |
| JP | 58137365 A | 8/1983 |
| JP | 06319170 A | 11/1994 |
| JP | 2004336316 A | 11/2004 |
| WO | WO0111926 A1 | 2/2001 |
| WO | WO2004023849 A1 | 3/2004 |

* cited by examiner

*Primary Examiner*—Que T Le

(57) ABSTRACT

A lighting system control device charging system and method including a control device charged from a light source in a lighting system, including control photovoltaic cell 28 responsive to control light 46 from the light source and generating control charging power 44; a capacitor storing the control charging power 44 and generating control supply power 42; and a control microcontroller unit (MCU)/transceiver 24 powered by control supply power 42 and generating a communications signal 40 to the lighting system. The control microcontroller unit (MCU)/transceiver 24 monitors charge state of the capacitor and directs the lighting system to increase the control light 46 when the charge state is below a low charge setpoint.

42 Claims, 3 Drawing Sheets

SYSTEM AND METHOD FOR CHARGING A CONTROL DEVICE FROM A LIGHTING SYSTEM

CROSS REFERENCE TO RELATED APPLICATIONS

This application claims the benefit of International Application No. PCT/IB2006/054460, filed Nov. 27, 2006, and U.S. Provisional Application Ser. No. 60/740,839 filed Nov. 30 2005 which are incorporated herein in whole be reference.

This invention relates generally to lighting systems, and more specifically to systems and methods for charging control devices.

Wireless lighting systems have been developed in which the power to the lamps is connected by wires, but some or all the control functions are communicated wirelessly. For example, lighting fixtures have been developed with wireless communication interfaces built-in or connected to communicate with other lighting fixtures and control devices, such as remote controls, wall dimmers, occupancy sensors, and light sensors. The control devices set the lighting for particular activities, time of day, and use. The control devices also include wireless communication interfaces, such as radio frequency (RF) communication interfaces. The wireless lighting systems can be arranged in a number of network topologies, such as a star, mesh, or cluster-tree structure.

One advantage of wireless control devices is flexibility, since no wiring is required between the wireless control device and the lighting fixtures it controls. For example, a light switch in a wired system is fixed to a wall near the lighting fixtures it controls. The switch in the wireless lighting system can be used anywhere it is in communication with the wireless lighting network. Such a switch is typically incorporated in a remote control. Other control devices, such as occupancy sensors, and light sensors, can also be located anywhere they are in communication with in the wireless lighting network.

The flexibility in placement of the wireless control devices creates other problems, however. The wireless control devices are wireless, and so lack connection to mains power. Power is typically provided by batteries, which have a limited life and must be replaced, incurring capital and maintenance costs. Some wireless control devices attempt to extend battery life by managing power consumption, such as using a standby mode when the device is not in operation. This approach is limited by the nature of the communications protocol in use in the wireless lighting system and the nature of the particular wireless lighting system. For example, the communications protocol may require that the wireless control device be active a majority of the time, rather than being in standby, to assure operation of the device and to relay information from lighting fixtures and other devices.

It would be desirable to have a system and method for charging control devices that overcomes the above disadvantages.

One aspect of the present invention provides a control device charged from a light source in a lighting system including a control photovoltaic cell responsive to control light from the light source and generating control charging power; a capacitor storing the control charging power and generating control supply power and a control microcontroller unit (MCU)/transceiver powered by control supply power and generating a communications signal to the lighting system. The control microcontroller unit (MCU)/transceiver monitors charge state of the capacitor and directs the lighting system to increase the control light when the charge state is below a low charge setpoint.

Another aspect of the present invention provides a method for charging a control device from a light source including providing the control device having a capacitor chargeable from a photovoltaic cell; monitoring charge state of the capacitor; determining when the charge state is less than a low charge setpoint; and increasing light from the light source to the photovoltaic cell when the charge state is less than the low charge setpoint.

Another aspect of the present invention provides a system for charging a control device from a light source, the control device having a capacitor chargeable from a photovoltaic cell, including means for monitoring charge state of the capacitor; means for determining when the charge state is less than a low charge setpoint; and means for increasing light from the light source to the photovoltaic cell when the charge state is less than the low charge setpoint.

Another aspect of the present invention provides a remote sensor charged from a light source in a lighting system including a control photovoltaic cell responsive to control light from the light source and generating control charging power; control power storage storing the control charging power and generating control supply power; a control microcontroller unit (MCU)/transceiver powered by control supply power and generating a communications signal to the lighting system; and a control operational interface receiving control operational input from a control external object and providing an operational signal to the control MCU/transceiver. The control microcontroller unit (MCU)/transceiver monitors charge state of the control power storage and directs the lighting system to increase the control light when the charge state is below a low charge setpoint.

Another aspect of the present invention provides a method for charging a remote sensor from a light source including providing the remote sensor having control power storage chargeable from a photovoltaic cell; monitoring charge state of the control power storage; determining when the charge state is less than a low charge setpoint; and increasing light from the light source to the photovoltaic cell when the charge state is less than the low charge setpoint.

Another aspect of the present invention provides a system for charging a remote sensor from a light source, the remote sensor having control power storage chargeable from a photovoltaic cell, including means for monitoring charge state of the control power storage; means for determining when the charge state is less than a low charge setpoint; and means for increasing light from the light source to the photovoltaic cell when the charge state is less than the low charge setpoint.

Another aspect of the present invention provides a control device charging system including control power storage generating control supply power; a control microcontroller unit (MCU)/transceiver powered by control supply power and generating a communications signal; a control operational interface receiving control operational input from a control external object and providing an operational signal to the control MCU/transceiver; a charger photovoltaic cell responsive to charger charging light and generating charger charging power; charger power storage storing the charger charging power and generating charger supply power and charger power; and a charger interface operably connectable to the control device interface to communicate the charger power through the control device interface between the charger power storage and the control power storage.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Figure 1:
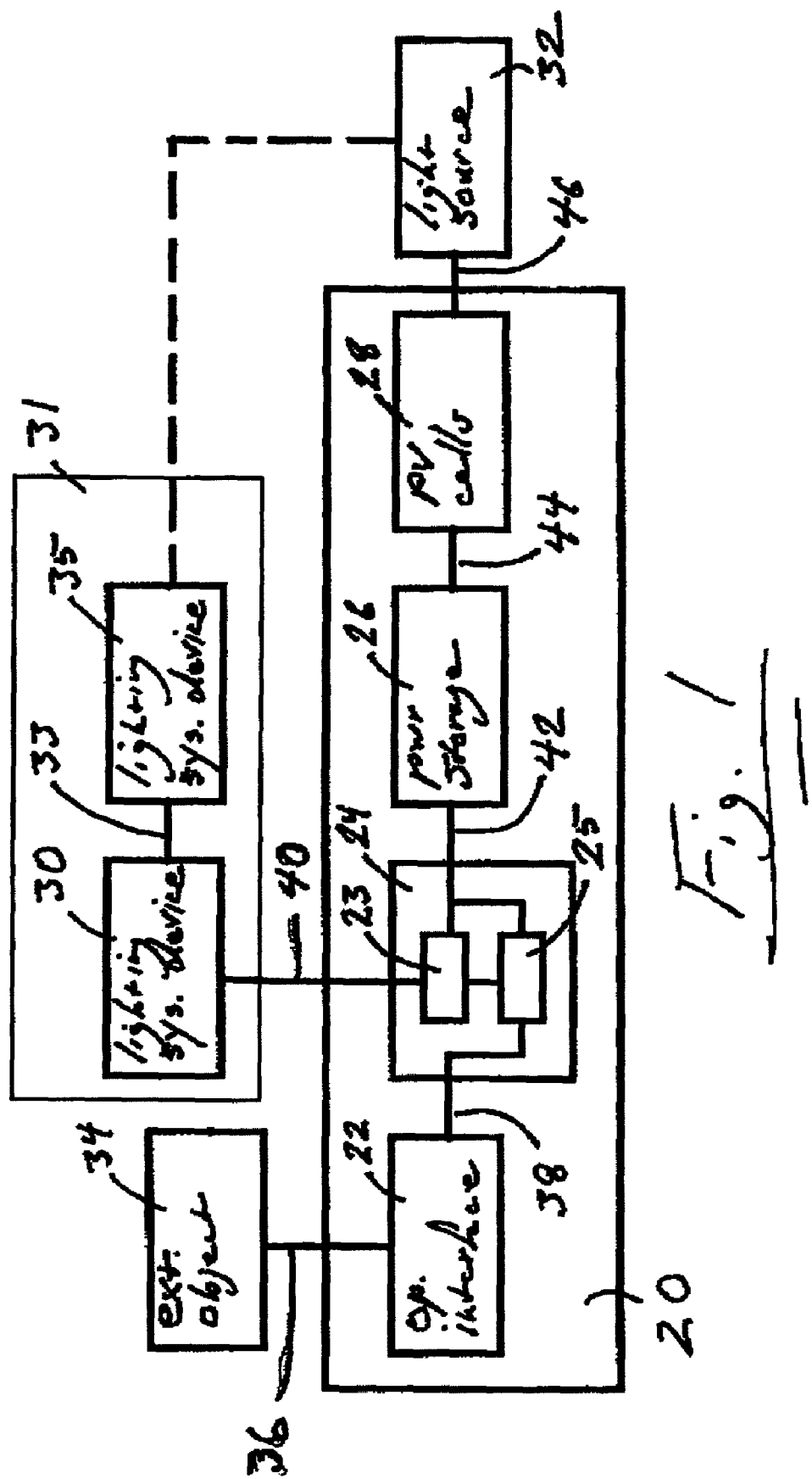
FIG. 1 is a block diagram of a control device made in accordance with the present invention.

FIG. 1 is a block diagram of a control device made in accordance with the present invention. The control device receives light from a light source and stores power from the light in power storage to power the control device. The control device 20 includes a control operational interface 22, a control microcontroller unit (MCU)/transceiver 24, control power storage 26, and a control photovoltaic cell 28. The control operational interface 22 receives control operational input 36 from control external object 34 and provides an operational signal 36 to the control MCU/transceiver 24. The control MCU/transceiver 24 communicates via communications signal 40 with at least one lighting system device 30. Typically, the lighting system device 30 is part of a lighting network 31 and is in wireless or wired communication with one or more other lighting system device 35 by means of network signal 33. The lighting system device 30 and the other lighting system device 35 can be a lighting fixture, a lighting fixture ballast, a local control box, a wired or wireless control, or the like. The control photovoltaic cell 28 receives control light 46 from a control light source 32 and provide control charging power 44 to the control power storage 26. In one embodiment, the control light source 32 is controlled by and is part of the lighting network 31. In another embodiment, the control light source 32 is controlled by and is part of another lighting network operably connected to lighting network 31. When the lighting system device 30 is a lighting fixture, the control light source 32 can be the lighting system device 30. The control power storage 26 stores the control charging power 44 for use as control supply power 42 by the control MCU/transceiver 24 and any other components within the control device 20 requiring power. Examples of the control device 20 are a remote control, which allows an operator to control the lighting system device 30 and/or other portions of the lighting network 31, and a remote sensor, which senses conditions in the vicinity of the control device 20 and provides information about those conditions to the lighting system device 30 and/or other portions of the lighting network 31. The control device 20 can include other components, such as a global positioning system (GPS) operably connected to provide location information to the control MCU/transceiver 24, to enhance operation.

The control operational interface 22 can be any operational interface suitable for receiving the control operational input 36 from the control external object 34. When the control device 20 is a remote control, the control external object 34 is an operator, the control operational interface 22 is a keyboard, and the control operational input 36 is the action of the operator on the keyboard. When the control device 20 is a remote sensor, the control operational interface 22 is a sensor suitable for the desired control, such as a light sensor, occupancy sensor, or the like. For the control operational interface 22 as a light sensor, the control external object 34 is a light source, such as a lighting fixture and/or natural light, and the control operational input 36 is the light from the light source. For the control operational interface 22 as an occupancy sensor, the control external object 34 is one or more occupants of an area and the control operational input 36 is the indication of the presence of the occupants, such as reflected sound waves, body heat, infrared light, or the like. Those skilled in the art will appreciate that the control operational interface 22 can also include or be associated with feedback to the operator or occupants. In one example, the control operational interface 22 can be a touch sensitive liquid crystal display. In another example, the control operational interface 22 can have indicating lights showing light or occupancy levels.

The control MCU/transceiver 24 can be any MCU/transceiver suitable for communicating with the at least one lighting system device 30 and controlling operation of the control device 20. The lighting system device 30 can be a lighting fixture, other control device, local lighting control, other local control, a building automation system, or the like. Typically, the lighting system device 30 is part of a lighting network 31 and is in wireless or wired communication with other lighting system devices 35 by means of a network signal 33. The control MCU/transceiver 24 includes a control MCU 25 and a control transceiver 23. The control MCU 25 directs communications with the at least one lighting system device 30 through the control transceiver 23. The control MCU 25 can also control operation of the control device 20.

The control microcontroller unit (MCU) 25 can be any microcontroller suitable for storing and processing instructions and data. The particular characteristics of the control MCU 25, such as n-bit architecture, clock speed, memory size, and the like, can be selected for the particular application. Examples of suitable microcontrollers are the 8-bit HCS08 and 16-bit HCS12 families manufactured by Freescale Semiconductor, Inc., of Austin, Tex., the AVR 8-Bit RISC Flash Microcontroller manufactured by Atmel Corporation of San Jose, Calif., and the STV0767 Imaging Digital Signal Processor manufactured by STMicroelectronics of Geneva, Switzerland. Those skilled in the art will appreciate that the control MCU 25 can be on a single chip including the control transceiver 23 or can be a separate chip. Besides managing communications in and out of the control device 20, the control MCU 25 can also manage power usage in the control device 20, such as placing the control device 20 in standby when not in use. Those skilled in the art will appreciate that the control MCU 25 can be used to manage these and other functions in the control device 20 as desired for a particular application. Those skilled in the art will also appreciate that the control MCU 25 is not limited to a microcontroller, but can be any circuit capable of monitoring the charge state of the control power storage 26 and providing that information to the control transceiver 23. Examples of other circuits include diode switching circuits, FET circuits, and the like.

The control transceiver 23 can be any transceiver for communicating between the control device 20 and the at least one lighting system device 30, which can be lighting fixtures, other control devices, local lighting controls, other local controls, and/or building automation systems. Typically, the control transceiver 23 operates at low voltage and with low power consumption and can incorporate power management features. In one embodiment, the control transceiver 23 communicates at 2.4 GHz in accordance with the IEEE 802.15.4 short-range wireless standard and the ZigBee networking standard protocol. In another embodiment, the control transceiver 23 communicates at 15 GHz. Examples of suitable transceivers are the MC13193 short range, low power, 2.4 GHz ISM band transceiver manufactured by Freescale Semiconductor, Inc. of Austin, Tex., the EM2420 transceiver manufactured by Ember Corporation of Boston, Mass., and the CC2420 RF transceiver manufactured by Chipcon AS, of Oslo, Norway. Those skilled in the art will appreciate that the control transceiver 23 can operate at various frequencies and with various protocols as desired for a particular application. The communications can follow any protocol desired, such as the Digital Addressable Lighting Interface (DALI) protocol set out in Annex E of the fluorescent ballast standard IEC 60929, the ZigBee protocol operating on top of the IEEE 802.15.4 wireless standard, the EmberNet protocol, a proprietary protocol, a non-proprietary protocol, or the like. The communications can take place over any desired band, such as radio frequency (RF), light, infrared light, sound, ultrasonic sound, or the like. Those skilled in the art will appreciate that the control transceiver 23 can be on a single chip including the control MCU 25 or can be a separate chip.

The control power storage 26 can be any power storage, including capacitors, batteries, and capacitor/battery combinations of both capacitors and batteries, suitable for providing power to the control device 20 and for charging from the control photovoltaic cell 28. The control MCU/transceiver 24 monitors the charge state of the control power storage 26 to determine when recharging is needed, and directs the control light source 32 through the lighting system device 30 to provide control light 46 to the control photovoltaic cell 28 when charging is required. In one embodiment, the control power storage 26 is a capacitor or bank of capacitors, such as the Panasonic EECS 5R5H155 available from Panasonic Industrial Corporation of Columbus, Ga., or the Elna DB-5R5D1555T available from Elna America, Inc., of Cypress, Calif. Such capacitors are also known as electric double layer capacitors. Those skilled in the art will appreciate that the capacitor specifications can be selected as required for a particular application. In one example, the capacitors are 5.5 Volt, 1.5 Farad. In another embodiment, the control power storage 26 is a rechargeable battery or bank of rechargeable batteries, such as the TL2100 or the TL2135 available from Tadiran Batteries of Port Washington, N.Y. Those skilled in the art will appreciate that the battery specifications can be selected as required for a particular application. In one example, the rechargeable batteries are 3.6 Volts, 2.1 Ampere-Hour. Examples of rechargeable batteries include nickel-cadmium batteries, nickel metal hydride batteries, lithium ion batteries, and lithium polymer batteries. In yet another embodiment, the control power storage 26 is a combination of capacitors and batteries. The operation of the capacitor/battery combination can be selected as desired for a particular application. In one example, the capacitors and batteries are connected in parallel. In another example, the charge state of the capacitors is monitored by the control MCU/transceiver 24 and the batteries provide backup power when the capacitor charge is low. In yet another embodiment, the control power storage 26 is a non-rechargeable battery or bank of non-rechargeable batteries. Those skilled in the art will appreciate that the form factor of the control power storage 26, such as cylindrical, cylinder bank, wafer, or wafer stack, can be selected for a particular application based on the power requirements, space available, and aesthetics.

The control photovoltaic cell 28 can be any photovoltaic cell suitable for converting control light 46 from a control light source 32 to control charging power 44 to charge the control power storage 26. The control light source 32 can be the sun, a lamp in a lighting fixture, a combination of the sun and a lamp in a lighting fixture, or any other light source. Exemplary control photovoltaic cells 28 include the CPC1822, CPC1824, or CPC1832 available from Clare, Inc., of Beverly, Mass. Those skilled in the art will appreciate that the battery specifications can be selected as required for a particular application. In several examples, the control photovoltaic cell 28 can be 4 Volts, 50 µAmps short circuit current, or 4 Volts, 100 µAmps short circuit current; or 8 Volts, 100 µAmps short circuit current. Those skilled in the art will appreciate that the control photovoltaic cell 28 can be one or a number of individual photovoltaic cells, connected in series or parallel to achieve the desired control charging power 44. The control photovoltaic cell 28 can be selected to generate the operating voltage, can be selected to produce a voltage greater then the operating voltage and include a regulation circuit, or can be selected to produce a voltage greater then the operating voltage and used in conjunction with a battery to regulate the output voltage. In one embodiment, the control photovoltaic cell 28 can include a charging interface such as a diode or other switch to prevent discharge of the control power storage 26 through the control photovoltaic cell 28.

In operation, the control device 20 is charged by the control photovoltaic cell 28 receiving control light 46 from the control light source 32 and providing control charging power 44 to the control power storage 26. In one embodiment, the control photovoltaic cell 28 charges from available light, scavenging any available lamp light and/or sunlight for power to the extent possible. When the control MCU/transceiver 24 detects that the charge state of the control power storage 26 is low, the control MCU/transceiver 24 transmits a communications signal 40 to the lighting system device 30 requesting the control light source 32 initiate or increase output of control light 46 to charge the control power storage 26. The control MCU/transceiver 24 can continue to monitor the charge state of the control power storage 26 while charging. When the charge state is normal or no longer low, the control MCU/transceiver 24 can transmit a communications signal 40 to the lighting system device 30 requesting the control light source 32 set the output of control light 46 to the present light demand to stop charging the control power storage 26, other than the charging from available light. In one embodiment, the control device 20 provides position indication, so that only the control light source 32 local to the present position of the control device 20 is turned on, saving power. The position indication can use any suitable method, such as GPS, triangulation, time-of-flight, or the like, so that the lighting system can determine the location of the control device 20. In another embodiment, the control device 20 emits an audible and/or visual alarm when the control MCU/transceiver 24 detects that the charge state of the control power storage 26 is low.

Figure 2:
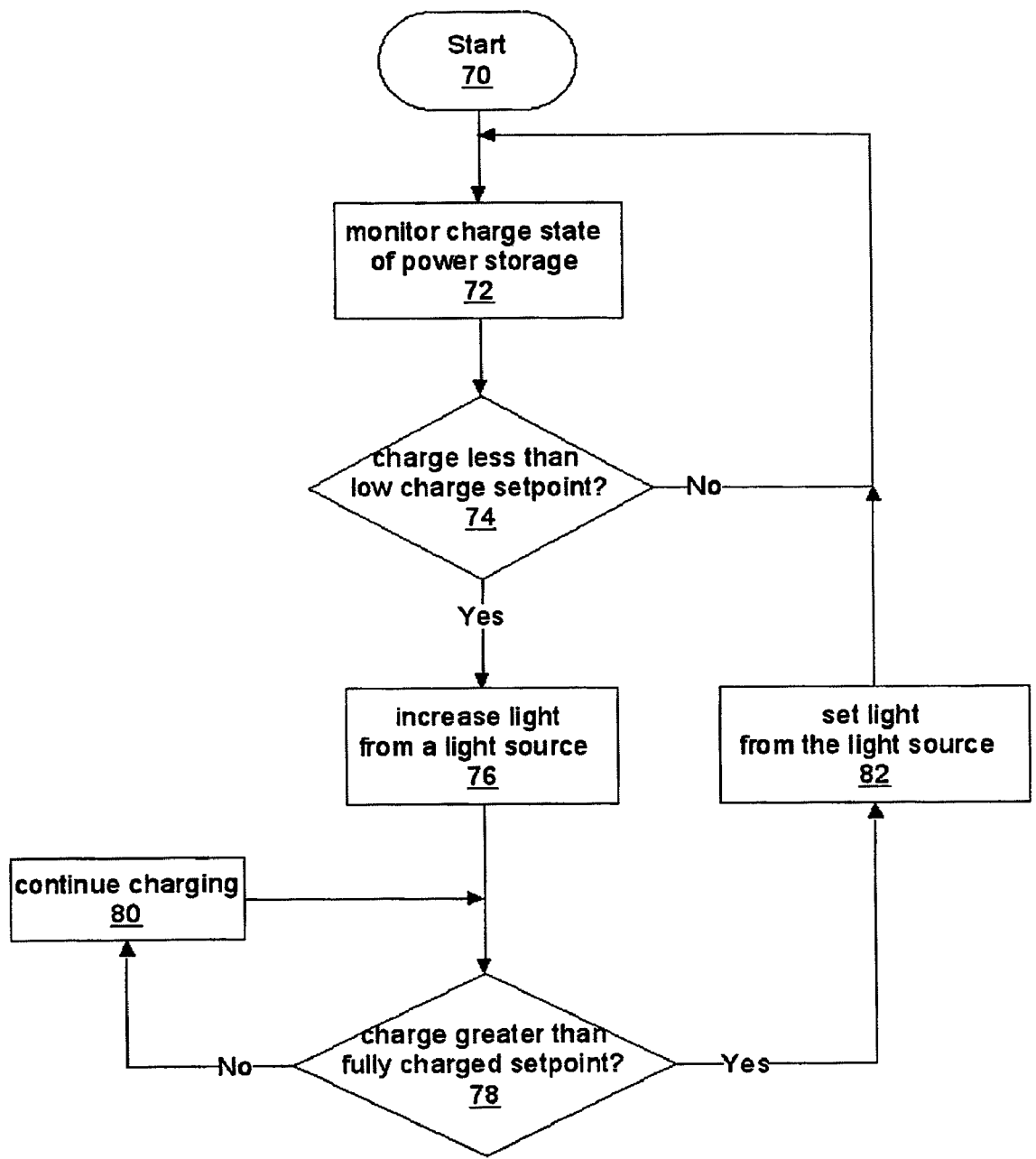
FIG. 2 is a flow chart of a method for charging control devices in accordance with the present invention.

FIG. 2 is a flow chart of a method for charging control devices in accordance with the present invention. The method starts at 70 and includes monitoring charge state of power storage in a control device, such as a remote control or a remote sensor 72, determining when the charge state is less than a low charge setpoint 74, increasing light from a light source to a control device when the charge state is less than a low charge setpoint 76, determining when the charge state is greater than a fully charged setpoint 78, continuing charging when the charge state is not greater than a fully charged setpoint 80, and setting light from the light source at a present light demand when the charge state is greater than the fully charged setpoint 82. The present light demand can be different from the light demand from which the light was increased at 76, as the light, occupancy, remote control setting, and/or other factor may have changed with time while the control device was charging under the increased light. The method can continue by returning to monitoring the charge state of the power storage in the control device 72. Those skilled in the art will appreciate that the operations typically occur when the control device is active: the control device can include power saving standby and/or sleep modes that delay an individual operation for a short time. In one embodiment, the method includes charging the control device from available light, such as available lamp light and/or sunlight, so that the control device uses whatever light is available for charging the power storage of the control device. When available light is sufficient to maintain a charge, there is no need to increase light at 76 to charge the control device. In another embodiment, when the power storage is a capacitor/battery combination with the battery providing backup power so the battery is a backup battery, the method can include powering the control device from the backup battery when the charge state is less than the low charge setpoint. In another embodiment, the method can include providing an alarm, such as an audible and/or visual alarm, when the charge state is less than the low charge setpoint. In yet another embodiment, the light source is a plurality of light sources, and the method can include locating a control device position by GPS, triangulation, time-of-flight, or the like, so that the increasing light from a light source to a control device when the charge state is less than a low charge setpoint 76 includes increasing light from the plurality of light sources by the control device position. This avoids lighting light sources that are too far from the control device to charge the control device.

Figure 3:
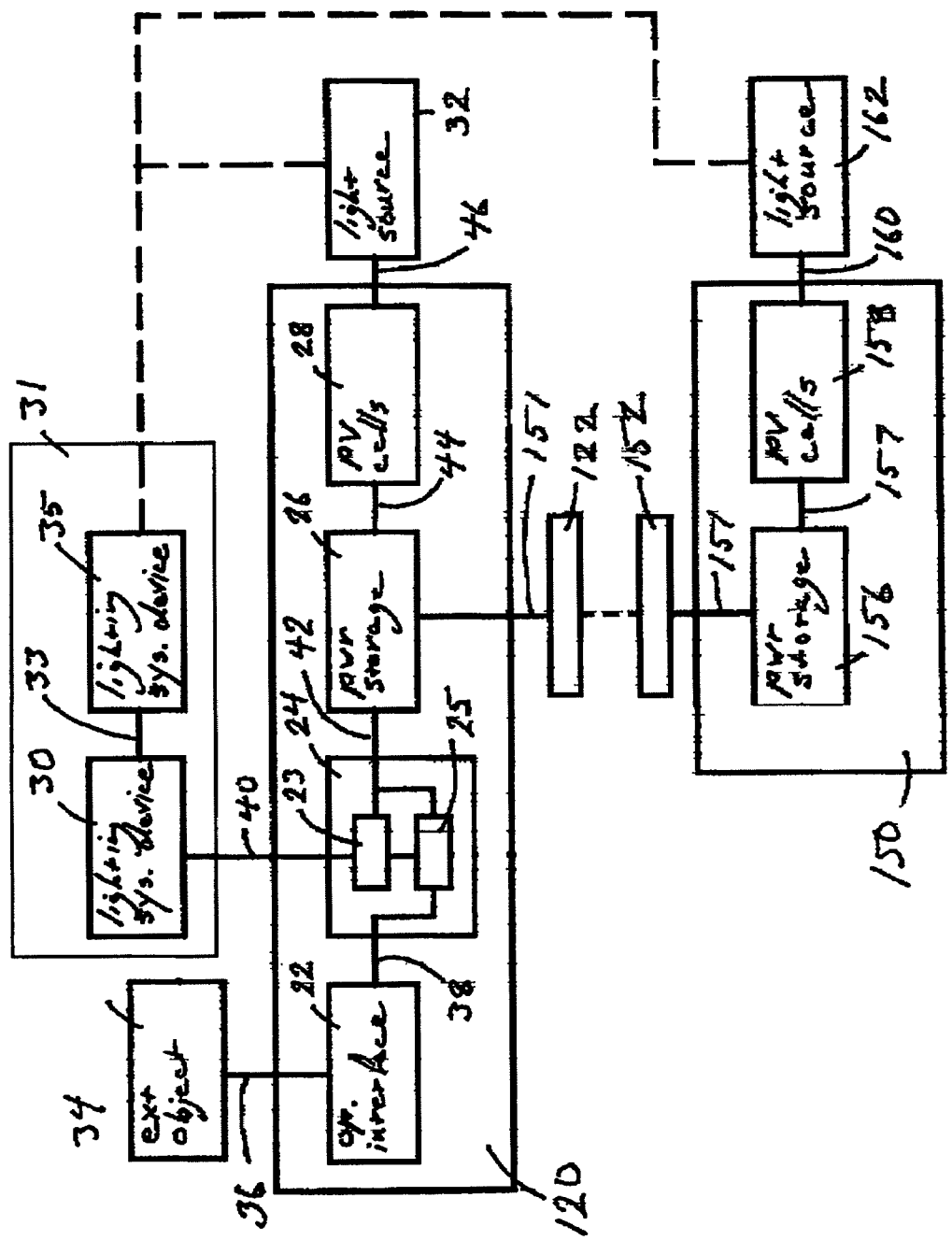
FIG. 3 is a block diagram of a control device charging system made in accordance with the present invention.

FIG. 3, in which like elements share like reference numbers with FIG. 1, is a block diagram of a control device charging system made in accordance with the present invention. In this embodiment, a charger is operably connectable to the control device to charge the power storage of the control device.

The control device 120, such as a remote control or remote sensor, includes a control device interface 122 operably connectable to a charger interface 152 of the charger 150. The charger 150 includes the charger interface 152, charger power storage 156, and charger photovoltaic cell 158. The charger power storage 156 is operably connectable to provide charger power 151 to the control power storage 26. The charger photovoltaic cell 158 receives charger charging light 160 from a charging light source 162 and provide charger charging power 157 to the charger power storage 156. In one embodiment, the charging light source 162 is controlled by and is part of the lighting network 31. The charging light source 162 can be the same as or different from the control light source 32. In another embodiment, the charging light source 162 is in a different lighting network than the control light source 32. The charger power storage 156 stores the charger charging power 157 for use as the charger power 151 for the control device 20. The charger power storage 156 also provides charger supply power 155 to any other components within the charger 150 requiring power.

The control device interface 122 and charger interface 152 are any suitable pair of interfaces for coupling the control device 120 to the charger 150, making connections between the control power storage 26 and the charger power storage 156 for the charger power 151. The control device interface 122 and charger interface 152 can have physical shapes so that the charger 150 receives the control device 120 or the control device 120 receives the charger 150.

The charger power storage 156 can be any power storage, including capacitors, batteries, and capacitor/battery combinations of both capacitors and batteries, suitable for charging from the charger photovoltaic cell 158 and for providing charger power 151 to the control device 20. In one embodiment, the charger power storage 156 is a capacitor or bank of capacitors, such as the Panasonic EECS 5R5H155 available from Panasonic Industrial Corporation of Columbus, Ga., or the Elna DB-5R5D1555T available from Elna America, Inc., of Cypress, Calif. Such capacitors are also known as electric double layer capacitors. Those skilled in the art will appreciate that the capacitor specifications can be selected as required for a particular application. In one example, the capacitors are 5.5 Volt, 1.5 Farad. In another embodiment, the charger power storage 156 is a rechargeable battery or bank of rechargeable batteries, such as the TL2100 or the TL2135 available from Tadiran Batteries of Port Washington, N.Y. Those skilled in the art will appreciate that the battery specifications can be selected as required for a particular application. In one example, the rechargeable batteries are 3.6 Volts, 2.1 Ampere-Hour. In yet another embodiment, the charger power storage 156 is a combination of capacitors and batteries. The operation of the capacitor/battery combination can be selected as desired for a particular application. In yet another embodiment, the charger power storage 156 is a non-rechargeable battery or bank of non-rechargeable batteries. Those skilled in the art will appreciate that the form factor of the charger power storage 156, such as cylindrical, cylinder bank, wafer, or wafer stack, can be selected for a particular application based on the power requirements, space available, and aesthetics.

The charger photovoltaic cell 158 can be any photovoltaic cell suitable for converting charger charging light 160 from a charging light source 162 to charger charging power 157 to charge the charger power storage 156. The charging light source 162 can be the sun, a lamp in a lighting fixture, a combination of the sun and a lamp in a lighting fixture, or any other light source. cellExemplary charger photovoltaic cells 158 include the CPC1822, CPC1824, or CPC1832 available from Clare, Inc., of Beverly, Mass. Those skilled in the art will appreciate that the battery specifications can be selected as required for a particular application. In several examples, the charger photovoltaic cell 158 can be 4 Volts, 50 µAmps short circuit current, or 4 Volts, 100 µAmps short circuit current; or 8 Volts, 100 µAmps short circuit current. Those skilled in the art will appreciate that the charger photovoltaic cell 158 can be one or a number of individual photovoltaic cell, connected in series or parallel to achieve the desired charger charging power 157. The charger photovoltaic cell 158 can be selected to generate the operating voltage, can be selected to produce a voltage greater then the operating voltage and include a regulation circuit, or can be selected to produce a voltage greater then the operating voltage and used in conjunction with a battery to regulate the output voltage. In one embodiment, the charger photovoltaic cell 158 can include a charging interface such as a diode or other switch to prevent discharge of the charger power storage 156 through the charger photovoltaic cell 158.

Those skilled in the art will appreciate that the design of the control device 120 and the charger 150 can be adapted for a particular application. In one embodiment, the control photovoltaic cell 28 can be omitted from the control device 120 and the control device 120 can rely on the charger 150 for power. In one embodiment, the charger 150 can include a charger microcontroller unit (MCU)/transceiver (not shown) in communication with at least one lighting system device 30. When the charger MCU/transceiver detects the charge state of the charger power storage 156 is below a low charge setpoint, the charger MCU/transceiver can direct a light source in the lighting system to turn on or increase the light to the charger photovoltaic cell 158 to recharge the charger power storage 156. The operation of the charger 150 with the charger MCU/transceiver is similar to the operation of the control device described above for FIGS. 1 & 2.

In operation, the charger 150 is charged by the charger photovoltaic cell 158 receiving charger charging light 160 from the charging light source 162 and providing charger charging power 157 to the charger power storage 156. The control device 120 can be placed in the charger 150 to charge the control power storage 26 of the control device 120 from the charger power storage 156 of the charger 150. The control device 120 can be charged rapidly from the charger 150 because the charger power storage 156 is kept charged. In one example of operation of the charger 150, the control device 120 is a remote control with the control power storage 26 being a capacitor/battery combination with the battery providing backup power. When the capacitor runs low on power, an audible and/or visual alarm is provided to the control external object 34, which in this case is an operator, through the control operational interface 22 or another indicator (not shown) and the control power storage 26 switches to the battery for power. The operator places the remote control in the charger 150 to charge. In another embodiment, the audible and/or visual alarm is omitted and the operator places the remote control in the charger 150 to charge when the remote control ceases to function.

In another example of operation of the charger 150, the control device 120 is a remote control with the control power storage 26 being a capacitor. When the capacitor runs low on power, an audible and/or visual alarm is provided to the control external object 34, which in this case is an operator, through the control operational interface 22 or another indicator (not shown). The operator places the remote control in the charger 150 to charge. In another embodiment, the audible and/or visual alarm is omitted and the operator places the remote control in the charger 150 to charge when the remote control ceases to function.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. A control device charged from a light source in a lighting system, comprising:
   a control photovoltaic cell responsive to control light from the light source and generating control charging power;
   a capacitor storing the control charging power and generating control supply power; and
   a control microcontroller unit (MCU)/transceiver powered by control supply power and generating a communications signal to the lighting system;
      wherein the control microcontroller unit (MCU)/transceiver monitors charge state of the capacitor and directs the lighting system to increase the control light when the charge state is below a low charge setpoint.

2. The device of claim 1, further comprising a battery operably connected to the capacitor to generate the control supply power when the charge state is below the low charge setpoint.

3. The device of claim 2, wherein the battery is a rechargeable battery.

4. The device of claim 1, further comprising a control operational interface receiving control operational input from a control external object and providing an operational signal to the control MCU/transceiver.

5. The device of claim 4, wherein the control operational interface is selected from the group consisting of: a keyboard, a touch sensitive liquid crystal display, a light sensor, and an occupancy sensor.

6. The device of claim 1, further comprising a global positioning system (GPS) operably connected to provide location information to the control MCU/transceiver.

7. A method for charging a control device from a light source, the method comprising:
   providing the control device having a capacitor chargeable from a photovoltaic cell;
   monitoring charge state of the capacitor; determining when the charge state is less than a low charge setpoint; and
   increasing light from the light source to the photovoltaic cell when the charge state is less than the low charge setpoint.

8. The method of claim 7, further comprising:
   determining when the charge state is greater than a fully charged setpoint; and
   setting light from the light source at a present light demand when the charge state is greater than the fully charged setpoint.

9. The method of claim 7, further comprising charging the control device from available light.

10. The method of claim 7, further comprising powering the control device from a backup battery when the charge state is less than the low charge setpoint.

11. The method of claim 7, further comprising providing an alarm when the charge state is less than the low charge setpoint.

12. The method of claim 7, wherein the light source is a plurality of light sources, further comprising locating a control device position, and wherein the step of increasing light comprises increasing light from the plurality of light sources at the control device position.

13. A system for charging a control device from a light source, the control device having a capacitor chargeable from a photovoltaic cell, comprising:
   means for monitoring charge state of the capacitor;
   means for determining when the charge state is less than a low charge setpoint; and
   means for increasing light from the light source to the photovoltaic cell when the charge state is less than the low charge setpoint.

14. The system of claim 13, further comprising:
   means for determining when the charge state is greater than a fully charged setpoint; and
   means for setting light from the light source at a present light demand when the charge state is greater than the fully charged setpoint.

15. The system of claim 13, further comprising means for charging the control device from available light.

16. The system of claim 13, further comprising means for powering the control device from a backup battery when the charge state is less than the low charge setpoint.

17. The system of claim 13, further comprising means for providing an alarm when the charge state is less than the low charge setpoint.

18. The system of claim 13, wherein the light source is a plurality of light sources, the system further comprising means for locating a control device position, and wherein the means for increasing light comprises means for increasing light from the plurality of light sources at the control device position.

19. A remote sensor charged from a light source in a lighting system comprising:
   control photovoltaic cell responsive to control light from the light source and generating control charging power;
   control power storage storing the control charging power and generating control supply power;

a control microcontroller unit (MCU)/transceiver powered by control supply power and generating a communications signal 40 to the lighting system; and a control operational interface receiving control operational input from a control external object and providing an operational signal to the control MCU/transceiver;

wherein the control microcontroller unit (MCU)/transceiver monitors charge state of the control power storage and directs the lighting system to increase the control light when the charge state is below a low charge setpoint.

20. The sensor of claim 19, wherein the control power storage is selected from the group consisting of: a capacitor, a rechargeable battery, and a capacitor/battery combination.

21. The sensor of claim 19, wherein the control power storage is a capacitor/battery combination comprising a battery operably connected to a capacitor, the battery generating the control supply power when the charge state is below the low charge setpoint.

22. The sensor of claim 21, wherein the battery is a rechargeable battery.

23. The sensor of claim 19, wherein the control operational interface is selected from the group consisting of: a light sensor and an occupancy sensor.

24. A method for charging a remote sensor from a light source, the method comprising:

providing the remote sensor having control power storage chargeable from a photovoltaic cell;

monitoring charge state of the control power storage; determining when the charge state is less than a low charge setpoint; and increasing light from the light source to the photovoltaic cell when the charge state is less than the low charge setpoint.

25. The method of claim 22, further comprising: determining when the charge state is greater than a fully charged setpoint; and setting light from the light source at a present light demand when the charge state is greater than the fully charged setpoint.

26. The method of claim 22, wherein the remote sensor is selected from the group consisting of: a light sensor and an occupancy sensor.

27. The method of claim 22, further comprising charging the remote sensor from available light.

28. The method of claim 22, wherein the control power storage is selected from the group consisting of: a capacitor, a rechargeable battery, and a capacitor/battery combination.

29. The method of claim 22, wherein the control power storage is a capacitor and battery combination, further comprising powering the control device from the battery when the charge state is less than the low charge setpoint.

30. The method of claim 29, wherein the battery is a rechargeable battery.

31. The method of claim 22, further comprising providing an alarm when the charge state is less than the low charge setpoint.

32. The method of claim 22, wherein the light source is a plurality of light sources, the method further comprising locating a control device position, and wherein the step of increasing light comprises increasing light from the plurality of light sources at the control device position.

33. A system for charging a remote sensor from a light source, the remote sensor having control power storage chargeable from a photovoltaic cell, comprising:

means for monitoring charge state of the control power storage; means for determining when the charge state is less than a low charge setpoint; and means for increasing light from the light source to the photovoltaic cell when the charge state is less than the low charge setpoint.

34. The system of claim 33, further comprising: means for determining when the charge state is greater than a fully charged setpoint; and means for setting light from the light source at a present light demand when the charge state is greater than the fully charged setpoint.

35. The system of claim 33, further comprising means for charging the remote sensor from available light.

36. The system of claim 33, wherein the control power storage is a capacitor and battery combination, the system further comprising means for powering the control device from the battery when the charge state is less than the low charge setpoint.

37. The system of claim 33, further comprising means for providing an alarm when the charge state is less than the low charge setpoint.

38. The method of claim 33, wherein the light source is a plurality of light sources, the method further comprising means for locating a control device position, and the means for increasing light comprises means for increasing light from the plurality of light sources at the control device position.

39. A control device charging system comprising:

a control power storage generating control supply power;

a control microcontroller unit (MCU)/transceiver powered by control supply power and generating a communications signal;

a control operational interface receiving control operational input from a control external object and providing an operational signal to the control MCU/transceiver;

a charger photovoltaic cell responsive to charger charging light and generating charger charging power;

a charger power storage storing the charger charging power and generating charger supply power and charger power; and a charger interface operably connectable to a control device interface to communicate the charger power through the control device interface between the charger power storage and the control power storage.

40. The system of claim 39, wherein the control operational interface is selected from the group consisting of: a keyboard, a touch sensitive liquid crystal display, a light sensor, and an occupancy sensor.

41. The system of claim 39, further comprising a charger microcontroller unit (MCU)/transceiver operably connected to monitor charge state of the charger power storage and to direct an increase in the charger charging light when the charge state is below a low charge setpoint.

42. The system of claim 39, further comprising a control photovoltaic cell responsive to control light and generating control charging power provided to the control power storage.

* * * * *